R. H. SMITH.
VEHICLE SPRING SUPPORT.
APPLICATION FILED MAY 31, 1912.

1,070,548.

Patented Aug. 19, 1913.

Figure 1:
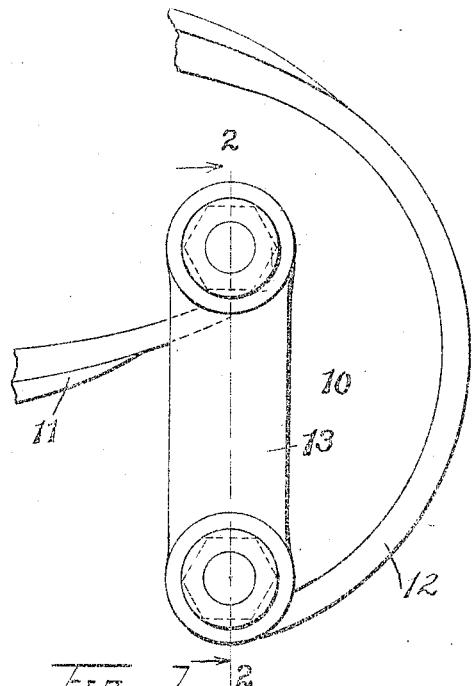

Witnesses:

Inventor.
Roy H. Smith though drawing, Figure 1 is a side view
UNITED STATES PATENT OFFICE.

ROY H. SMITH, OF CLEVELAND, OHIO.

VEHICLE SPRING-SUPPORT.

1,070,548.  Specification of Letters Patent.  Patented Aug. 19, 1913.

Application filed May 31, 1912. Serial No. 760,602.

*To all whom it may concern:*

Be it known that I, ROY H. SMITH, a citizen of the United States, residing at Cleveland, in the county of Cuyahoga and State of Ohio, have invented a certain new and useful Improvement in Vehicle Spring-Supports, of which the following is a full, clear, and exact description.

This invention relates to shackles and other supports or couplings for the ends of vehicle springs, and it relates especially to certain improvements in a combined supporting bolt and lubricator for the eye of the spring.

The object of the invention is to provide a construction which is efficient and far less expensive and troublesome to make than the devices employed heretofore.

More specifically, the invention aims to do away with the necessity of welding to or of otherwise forming on the bolt shank by the expensive processes employed heretofore a bolt head and lubricating cup, and to provide a construction wherein an ordinary bolt may be employed to support the spring and to convey to the spring eye, lubricant from a clamping nut which is formed to serve as a lubricant cup.

My invention may be briefly summarized as consisting in certain novel details of construction and combinations and arrangements of parts which will be described in the specification and set forth in the appended claims.

Figure 2:
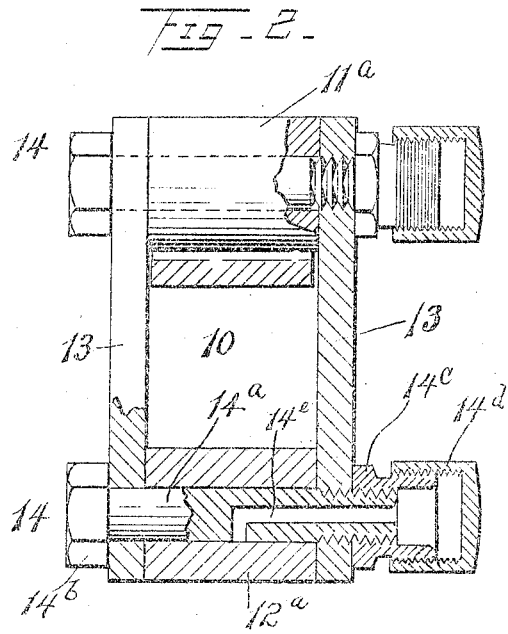
Figure 3:
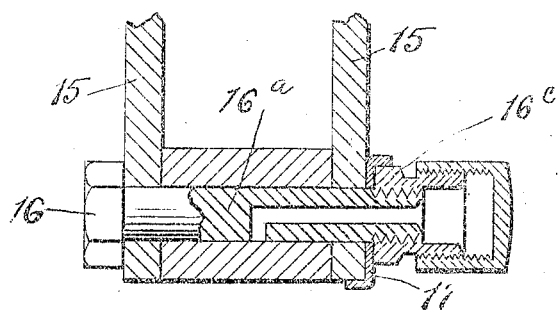

In the drawing, Figure 1 is a side view of the shackle and the ends of two springs supported and coupled together by the shackle; Fig. 2 is a sectional view substantially along the line 2—2 of Fig. 1, looking in the direction indicated by the arrows; Fig. 3 is a vertical section through the lower part of a shackle showing a modification of my invention.

Reference is now had to the drawings, wherein I have shown my invention embodied in a shackle 10 serving as a support for and coupling between the ends of two springs 11 and 12, which together form a so-called elliptic or three-quarter elliptic spring for vehicles. The shackle in the main is of general construction and includes a pair of swinging links 13, and a pair of clamping bolts 14, one passing between the upper ends of the links and through an eye 11ª formed on the end of spring 11, the eye being located between the links, and the other bolt passing through the lower ends of the links and through an eye 12ª at the end of spring 12, which is similarly situated between the two links.

My invention resides particularly in the bolt which enters into the combination of parts constituting the spring support or coupling, together with means for providing lubrication for the bearing surfaces of the bolt shank and spring eye. Ordinarily in constructions of this type, provision is made for lubrication by providing on the bolt shank a special head which is designed to serve as a lubricant cup and is usually welded to the shank or otherwise formed by a process equally or more expensive. In accordance with my invention, I utilize a bolt of ordinary construction which is relatively inexpensive to manufacture and which includes a shank 14ª and the usual bolt head 14ᵇ, forming one of the clamping abutments for the construction. The opposite end of the bolt shank is threaded and on the portion which extends beyond the adjacent link 13, I provide a special clamping nut 14ᶜ. This nut has next to the link a portion which coöperates with the head to form the two clamping abutments between which the links and the spring eye are clamped. The nut also has an extension which serves as a lubricant cup, and is threaded on the exterior to receive a cap 14ᵈ forming a closure for the cup. The lubricant is conveyed from the cup to the bearing surfaces by means of a duct 14ᵉ, which extends axially from the threaded end of the shank to a point substantially midway between the links and thence laterally to the surface of the shank, so as to convey the lubricant to the bearing surfaces. The construction at one end of the shackle is preferably the same as at the other end, as is illustrated clearly in Fig. 2. This simple shackle construction is equally efficient and in many cases more efficient than the prior constructions, but is far less expensive than the latter.

In the shackle, some means should be provided for preventing the loosening of the bolts and nuts, and in the form shown in Fig. 2, this is accomplished by threading the bolt openings in one of the links, and by extending the threaded portions of the bolt shanks so that each bolt has a screwed or threaded connection with this link, in which event, the nuts 14ᶜ when tightened serve as lock nuts.

In the construction shown in Fig. 3, wherein the links are designated 15, and the bolt 16, the bolt shank 16ᵃ passes freely through the openings in both links and the nut 16ᶜ is prevented from turning by a nut lock 17 in the form of a washer between the nut and the adjacent link 15, which washer has a portion bent laterally over one of the flattened faces of the nut and another portion bent over the end of the link to prevent the nut from turning. In this construction, the nut, together with its associated cap, serves as a lubricant cup, and the lubricant is conveyed inwardly and laterally from the end of the shank, as in the case first described.

Having thus described my invention, what I claim is:

1. In combination, a vehicle spring having an eye at its end and a support for the spring comprising two side members which receive the eye between them, a bolt passing through the side members and through the eye, said bolt having a shank and two clamping abutments consisting of a head at one end of the shank and a nut at the other end thereof, the shank having a duct extending axially from the end provided with the nut, the said nut having an annular threaded part and a cap screwed onto said part of the nut, said nut and cap constituting a lubricant container of which the cap forms one part and the nut another part.

2. In combination with a vehicle spring having an eye at its end, a spring-securing and lubricating bolt having a shank passing through the eye and provided at one end with an integral head and at the other end with a nut, and the said shank having a duct extending axially from the end provided with the nut, said nut having a part shaped to accommodate a wrench and having a circular exteriorly threaded part, and a cap adjustably screwed onto said threaded part and forming with the nut a two-part lubricant container of which the cap forms one part, and the nut the other part.

In testimony whereof, I hereunto affix my signature in the presence of two witnesses.

ROY H. SMITH.

Witnesses:
 A. F. KWIS,
 A. J. HUDSON.